(12) United States Patent
Kimba Dit Adamou et al.

(10) Patent No.: US 11,223,979 B2
(45) Date of Patent: Jan. 11, 2022

(54) METHOD FOR HANDLING DATA RADIO BEARER INTEGRITY CHECK FAILURE AND NETWORK EQUIPMENT

(71) Applicant: VIVO MOBILE COMMUNICATION CO., LTD., Guangdong (CN)

(72) Inventors: Boubacar Kimba Dit Adamou, Guangdong (CN); Xiaodong Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 41 days.

(21) Appl. No.: 16/623,339

(22) PCT Filed: Jun. 11, 2018

(86) PCT No.: PCT/CN2018/090609
§ 371 (c)(1),
(2) Date: Dec. 16, 2019

(87) PCT Pub. No.: WO2018/228321
PCT Pub. Date: Dec. 20, 2018

(65) Prior Publication Data
US 2020/0229047 A1  Jul. 16, 2020

(30) Foreign Application Priority Data

Jun. 15, 2017 (CN) .......................... 201710454147.1

(51) Int. Cl.
*H04W 36/00* (2009.01)
*H04W 76/19* (2018.01)
(Continued)

(52) U.S. Cl.
CPC ....... *H04W 36/0027* (2013.01); *H04W 12/10* (2013.01); *H04W 24/04* (2013.01);
(Continued)

(58) Field of Classification Search
CPC ......... H04W 36/0027; H04W 36/0016; H04W 76/19; H04W 76/15; H04W 76/27; H04W 12/10; H04W 24/04
See application file for complete search history.

(56) References Cited

U.S. PATENT DOCUMENTS 10,791,497 B2 * 9/2020 Kim ................... H04W 52/0229
2009/0320100 A1 * 12/2009 Kitazoe .................... H04L 63/20
726/3

(Continued)

FOREIGN PATENT DOCUMENTS

CN 104349361 A 2/2015
CN 104936169 A 9/2015
(Continued)

OTHER PUBLICATIONS

International Preliminary Report on Patentability and Translation of International Preliminary Report on Patentability, dated Dec. 17, 2019, for PCT/CN2018/090609, dated Jun. 11, 2018, consisting of 4 Pages.
Translation of Written Opinion, dated Nov. 4, 2019, for PCT/CN2018/090609, dated Jun. 11, 2018, consisting of 4 Pages.
(Continued)

*Primary Examiner* — Khai M Nguyen
(74) *Attorney, Agent, or Firm* — Gearhart Law LLC; David Postolski, Esq.

(57) ABSTRACT

A method for handling data radio bearer (DRB) integrity check failure (ICF), network equipment and a terminal are provided. The method includes: acquiring an ICF event of a DRB for a terminal; and performing a predetermined handling operation according to the ICF event. An intact data transmission over the DRB is achieved by acquiring the ICF event of the DRB for the terminal and further performing the
(Continued)

```
┌─────────────────────────────────────────────────┐
│                                                 │  ╱ 11
│  acquiring an ICF event of a DRB for a terminal │
│                                                 │
└─────────────────────────────────────────────────┘
                         │
                         ▼
┌─────────────────────────────────────────────────┐
│                                                 │  ╱ 12
│  performing a predetermined handling operation  │
│           according to the ICF event            │
│                                                 │
└─────────────────────────────────────────────────┘
``` predetermined handling operation for data integrity protection according to the ICF event.

19 Claims, 2 Drawing Sheets

(51) Int. Cl.
- *H04W 76/15* (2018.01)
- *H04W 76/27* (2018.01)
- *H04W 12/10* (2021.01)
- *H04W 24/04* (2009.01)

(52) U.S. Cl.
CPC ....... *H04W 36/0016* (2013.01); *H04W 76/15* (2018.02); *H04W 76/19* (2018.02); *H04W 76/27* (2018.02)

(56) References Cited

U.S. PATENT DOCUMENTS

| | | | |
|---|---|---|---|
| 2014/0335872 | A1 | 11/2014 | Yamada |
| 2015/0223282 | A1 | 8/2015 | Vajapeyam et al. |
| 2016/0183321 | A1 | 6/2016 | Wen et al. |
| 2016/0192249 | A1 | 6/2016 | Wu |
| 2017/0195882 | A1* | 7/2017 | Liao ......... H04L 63/20 |
| 2020/0092842 | A1* | 3/2020 | Kim ......... H04W 76/10 |
| 2020/0205003 | A1* | 6/2020 | Ingale ......... H04W 12/04 |

FOREIGN PATENT DOCUMENTS

| | | |
|---|---|---|
| CN | 105744626 A | 7/2016 |
| CN | 105960772 A | 9/2016 |

OTHER PUBLICATIONS

International Search Report, dated Dec. 20, 2018, for PCT/CN2018/090609, dated Jun. 11, 2018, consisting of 3 Pages.
Translation of International Search Report, dated Dec. 20, 2018, for PCT/CN2018/090609, dated Jun. 11, 2018, consisting of 2 Pages.
Written Opinion, dated Dec. 20, 2018, for PCT/CN2018/090609, dated Jun. 11, 2018, consisting of 3 Pages.
Third Office Action, dated Jun. 10, 2020 for CN 201710454147.1, dated Jun. 15, 2017, consisting of 11 Pages.
Translation of Third Office Action, dated Jun. 10, 2020 for CN 201710454147.1, dated Jun. 15, 2017, consisting of 7 Pages.
Kyocera Corp., "Change Request—X2AP cause value notation," 3GPP TSG-RAN WG3, Meeting #88, May 25-29, 2015, Fukuoka, Japan, consisting of 4 Pages.
Vivo, "Further consideration on integrity check failure," 3GPP TSG-RAN WG2, Meeting #99, Aug. 21-25, 2017, Berlin, Germany, consisting of 4 Pages.

\* cited by examiner

METHOD FOR HANDLING DATA RADIO BEARER INTEGRITY CHECK FAILURE AND NETWORK EQUIPMENT

CROSS-REFERENCE TO RELATED APPLICATION

This application is the U.S. national phase of PCT Application No. PCT/CN2018/090609 filed on Jun. 11, 2018, which claims a priority of the Chinese patent application No. 201710454147.1 filed in China on Jun. 15, 2017, disclosures of which are incorporated herein by reference in their entireties.

TECHNICAL FIELD

The present disclosure relates to the field of communication technology, in particular to a method for handling data radio bearer (DRB) integrity check failure (ICF) and network equipment.

BACKGROUND

With the development of wireless mobile communication technology, increasing demands on high data rate, low latency and low cost are put forth. In long term evolution (LTE) systems, a network architecture of dual connectivity (DC) has been introduced. In a DC scenario, data radio bearers (DRBs) are categorized into secondary cell group (SCG) bearer, master cell group (MCG) bearer and split bearer.

In future $5^{th}$ generation (5G) mobile communication systems, also known as new radio (NR) systems, a DC scenario similar to that in the LTE system is introduced, so as to achieve the high data rate, low latency and high reliability of data transmission. User plane protocol devices on the network equipment side in the MCG and SCG include specifically: a packet data convergence protocol (PDCP) entity, a radio link control (RLC) protocol entity and a media access control (MAC) entity. The network equipment in the MCG and SCG is connected via an Xn interface.

Although a high data rate, low latency and high reliability data transmission may be achieved in a DC scenario, an integrity check failure (ICF) of DRB may occur in the actual process of wireless data transmission or during a handover between a master cell and a secondary cell. The related art does not provide a handling mechanism for network equipment in the SCG and MCG to handle the ICF of the DRB.

SUMMARY

In a first aspect, embodiments of the present disclosure provide a method for handling data radio bearer (DRB) integrity check failure (ICF), applied to a first network equipment, including: acquiring an ICF event of a DRB for a terminal; and performing a predetermined handling operation according to the ICF event.

In a second aspect, embodiments of the present disclosure provide a network equipment, applied to a first network equipment, including: a first acquisition module, configured to acquire an ICF event of a DRB for a terminal; and a first handling module, configured to perform a predetermined handling operation according to the ICF event.

In a third aspect, embodiments of the present disclosure provide network equipment, including a processor, a storage and a computer program stored in the storage, where when executing the computer program, the processor is configured to implement steps of the method for handling DRB ICF as described in the first aspect above.

In a fourth aspect, embodiments of the present disclosure provide a computer readable storage medium storing therein a computer program, where the computer program is configured to be executed by a processor, to implement steps of the method for handling DRB ICF as described in the first aspect above.

In a fifth aspect, embodiments of the present disclosure provide a method for handling DRB ICF, applied to a terminal, including: acquiring an ICF event of a DRB between the terminal and a second network equipment; transmitting, according to the ICF event, fifth feedback information to a first network equipment; where the first network equipment is one of a master network node and a secondary network node for the terminal, and the second network equipment is the other one of the master network node and the secondary network node for the terminal.

In a sixth aspect, embodiments of the present disclosure provide a terminal, including: a second acquisition module, configured to acquire an ICF event of a DRB between the terminal and a second network equipment; and a second handling module, configured to transmit, according to the ICF event, fifth feedback information to the first network equipment. The first network equipment is one of a master network node and a secondary network node for the terminal, and the second network equipment is the other one of the master network node and the secondary network node for the terminal.

In a seventh aspect, embodiments of the present disclosure provide a terminal, including a processor, a storage and a computer program stored in the storage, where when executing the computer program, the processor is configured to implement steps of the method for handling DRB ICF as described in the fifth aspect above.

In an eighth aspect, embodiments of the present disclosure provide a computer readable storage medium storing therein a computer program, where the computer program is configured to be executed by a processor, to implement steps of the method for handling DRB ICF as described in the fifth aspect above.

In view of the above, according to the method for handling DRB ICF, the network equipment and the terminal provided by embodiments of the present disclosure, by acquiring the ICF event of the DRB for the terminal, and further performing, according to the ICF event, the predetermined handling operation configured to protect data integrity, an intact data transmission over the DRB is achieved.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person ordinary skilled in the art can obtain other drawings based on the described drawings without creative efforts.

DETAILED DESCRIPTION

Hereinafter, the exemplary embodiments of the present disclosure are described in detail with reference to the accompanying drawings. Understandably, although the exemplary embodiments of the present disclosure are illustrated with reference to the accompanying drawings, the disclosure may be embodied in many different forms and should not be construed as being limited to the embodiments set forth herein. Rather, these embodiments are provided so that the present disclosure will be thorough, and will fully convey the scope of the present disclosure to a person of ordinary skill in the art.

Terms "first", "second" and the like in the specification and claims of the present disclosure are adopted not to describe a specific sequence or order but to distinguish similar objects. It should be understood that data used like this may be interchanged under a proper condition for implementation of the embodiments of the present disclosure described herein in a sequence apart from those shown or described herein. In addition, terms "include" and "have" and any variant thereof are intended to cover nonexclusive inclusions. For example, a process, method, system, product or equipment including a series of steps or units is not limited to those steps or units which are clearly listed, but may include other steps or units which are not clearly listed or intrinsic to the process, the method, the product or the equipment.

Figure 1:
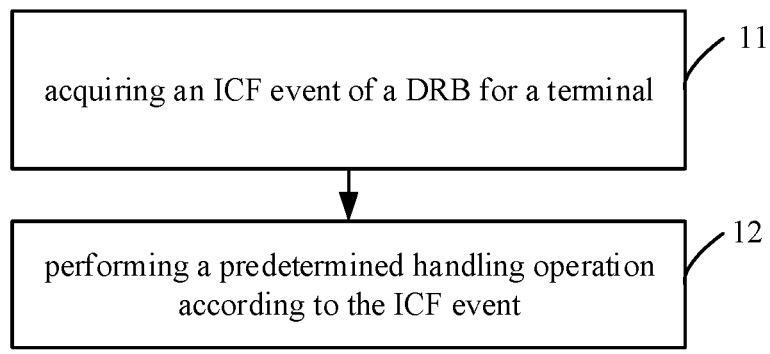
FIG. 1 illustrates a schematic flow chart of a method for handling DRB ICF, applied to a network equipment side, provided by embodiments of the present disclosure.

Embodiments of the present disclosure provide a method for handling DRB ICF, applied to a network equipment side. As shown in FIG. 1, the method specifically includes following steps: step 11, acquiring an ICF event of a DRB for a terminal; and step 12, performing a predetermined handling operation according to the ICF event.

By acquiring the ICF event of the DRB for the terminal, and further performing the predetermined handling operation for data integrity protection according to the ICF event, an intact data transmission over the DRB is enabled, thereby improving the transmission reliability of networks.

The mode of the acquisition in the step 11 may include an active detection mode and a passive reception mode, which will be described hereinafter in connection with different application scenarios.

Active Detection Mode.

The step 11 specifically includes: detecting a DRB between a first network equipment and the terminal; and triggering a generation of the ICF event, in case that it is detected that an ICF occurs to the DRB between the first network equipment and the terminal. Herein, the first network equipment may be a master network node for the terminal or a secondary network node for the terminal.

In this acquisition mode, the step 12 specifically includes: after the generation of the ICF event, performing at least one of following handling operations: operation 1, releasing the DRB between the first network equipment and the terminal; or operation 2, transmitting, to second network equipment, first feedback information for indicating the ICF event.

The first network equipment is one of a master network node and a secondary network node for the terminal, and the second network equipment is the other one of the master network node and the secondary network node for the terminal. In specific, if the first network equipment is the master network node for the terminal, the second network equipment is the secondary network node for the terminal, and vice versa.

Further, the first feedback information includes at least one of: information about the failure DRB between the first network equipment and the terminal, or information as to reason why the first network equipment releases the DRB between the first network equipment and the terminal.

The information about the failure DRB includes at least one of: first indication information for indicating whether the DRB is a split DRB; identification information of the DRB; identification information of a logical channel corresponding to the DRB; second indication information for indicating an uplink DRB failure; or third indication information for indicating a downlink DRB failure.

In a case that the first network equipment is the master network node for the terminal, that is, the master network node detects an ICF occurring to the DRB between the master network node and the terminal, the foregoing operation 1 or operation 2 is performed. After the operation 2 is performed, following operations are further performed: receiving second feedback information transmitted by the second network equipment; reconfiguring a DRB between the second network equipment and the terminal after the second feedback information is received, and transmitting corresponding configuration information to the second network equipment. The second feedback information is transmitted by the second network equipment after the second network equipment releases a DRB between the second network equipment and the terminal according to the first feedback information. In other words, after the secondary network node receives the first feedback information, the secondary network node releases the DRB between the secondary network node and the terminal and transmits feedback information to the master network node. After the master network node is informed that the secondary network node has released the DRB between the secondary network node and the terminal, the master network node reconfigures a DRB between the secondary network node and the terminal and informs the secondary network node of related configuration information.

Further, in a case that the first network equipment is the secondary network node, that is, the secondary network node detects an ICF occurring to the DRB between the secondary network node and the terminal, the foregoing operation 1 or operation 2 is performed. The operation 1 may be specifically achieved through following means: releasing the DRB between the first network equipment and the terminal; or releasing a wireless link connection between the first network equipment and the terminal; or triggering a handover procedure between the first network equipment and other secondary network node.

Passive Reception Mode.

The passive reception mode generally includes three different modes: an intercommunication mode between the master and secondary network nodes; an intercommunication mode between a network node before a handover and a network node after the handover; and a terminal reporting mode.

A first scenario: intercommunication mode between the master and secondary network nodes.

The step 11 specifically includes: receiving third feedback information for indicating the ICF event that is transmitted by second network equipment.

The third feedback information is transmitted by the second network equipment after the second network equipment detects an ICF of a DRB between the second network equipment and the terminal. The third feedback information specifically includes at least one of: information about the failure DRB between the second network equipment and the terminal, or information about a reason for that the second network equipment releases the DRB between the second network equipment and the terminal. The content carried in the information about the failure DRB is similar to that in the information about the failure DRB in the foregoing active detection mode, thus a repeated description is omitted herein.

The first network equipment is one of a master network node and a secondary network node for the terminal, and the second network equipment is the other one of the master network node and the secondary network node for the terminal. In specific, if the first network equipment is the master network node for the terminal, then the second network equipment is the secondary network node for the terminal, and vice versa.

Specifically, in a case that the first network equipment is the secondary network node, the master network node detects an ICF occurring to the DRB between the master network node and the terminal, and informs the secondary network node of the ICF event. Herein, the step 12 specifically includes: releasing, according to the ICF event of the DRB indicated by the third feedback information, the DRB corresponding to the ICF event and feeding the releasing of the DRB back to the second network equipment. In another word, after the secondary network node receives the ICF event informed by the master network node, the secondary network node releases the DRB between the master network node and the terminal, and transmits feedback information to the master network node.

Further, in a case that the first network equipment is the master network node, the secondary network node detects the ICF of the DRB between the secondary network node and the terminal, and informs the master network node of the ICF event. Herein, the step 12 specifically includes: after the third feedback information transmitted by the second network equipment is received, performing at least one of following handling operations:

triggering a packet counting and checking procedure between the first network equipment and the terminal;

releasing the DRB between the first network equipment and the terminal; triggering an integrity protection procedure of the DRB between the first network equipment and the terminal;

releasing a wireless link connection or the DRB between the second network equipment and the terminal;

reconfiguring a wireless link connection between the second network equipment and the terminal; or triggering a handover procedure between the second network equipment and other secondary network node.

A second scenario: intercommunication mode between a network node before a handover and a network node after the handover.

The step 11 specifically includes: receiving fourth feedback information for indicating the ICF event that is transmitted by second network equipment; instructing, according to the ICF event indicated by the fourth feedback information, the terminal to retransmit a corresponding packet, when a connection is established between the first network equipment and the terminal. The fourth feedback information is transmitted by the second network equipment after the second network equipment detects an ICF of a DRB between the second network equipment and the terminal during a procedure of a handover.

The first network equipment is a master network node or secondary network node after the handover, and the second network equipment is a master network node or secondary network node before the handover.

In other words, in case that an ICF event occurs at a side of an original network node during the handover procedure, the original network node transmits, to a target network node, the fourth feedback information for indicating the ICF event. After the target network node receives the fourth feedback information and establishes a connection with the terminal, the target network node instructs the terminal to retransmit a packet according to information of damaged packets indicated in the fourth feedback information.

A Third Scenario: Terminal Reporting Mode.

The step 11 specifically includes: receiving fifth feedback information for indicating the ICF event that is transmitted by the terminal.

The fifth feedback information is transmitted by the terminal after the terminal detects an ICF of a DRB between the terminal and second network equipment, and the fifth feedback information specifically includes information about the failure DRB between the second network equipment and the terminal. The information about the failure DRB includes at least one of: first indication information for indicating whether the DRB is a split DRB; identification information of the DRB; or identification information of a logical channel corresponding to the DRB.

The first network equipment is one of a master network node and a secondary network node for the terminal, and the second network equipment is the other one of the master network node and the secondary network node for the terminal.

Further, after the fifth feedback information is received, the first network equipment transmits, to the second network equipment, indication information for indicating the ICF event, so as to inform the second network equipment of the ICF event of the DRB between the second network equipment and the terminal.

Specifically, in a case that the first network equipment is the secondary network node, that is, when the terminal detects an ICF of a DRB between the terminal and the master network node, the terminal reports the ICF event to the secondary network node. The step 12 performed by the secondary network node specifically includes: after the fifth feedback information transmitted by the terminal is received, performing at least one of following handling operations: requesting the second network equipment to release a wireless link connection or the DRB between the second network equipment and the terminal; triggering an integrity protection procedure of a DRB between the first network equipment and the terminal; or requesting the second network equipment to reconfigure a wireless link connection between the second network equipment and the terminal.

Specifically, in a case that the first network equipment is the master network node, that is, when the terminal detects an ICF of a DRB between the terminal and the secondary network node, the terminal reports the ICF event to the master network node. The step 12 performed by the master network node specifically includes: after the fifth feedback information transmitted by the terminal is received, performing at least one of following handling operations:

triggering a packet counting and checking procedure between the first network equipment and the terminal; triggering an integrity protection procedure for a DRB between the first network equipment and the terminal; releasing a wireless link connection or the DRB between the second network equipment and the terminal; reconfiguring a wireless link connection between the second network equipment and the terminal; or triggering a handover procedure between the second network equipment and other secondary network nodes.

According to the method for handling DRB ICF provided by embodiments of the present disclosure, by acquiring the ICF event of the DRB for the terminal, and further performing, according to the ICF event, the predetermined handling operation configured to protect data integrity, the network equipment enables an intact data transmission over the DRB, thereby improving the transmission reliability of network.

The method for handling DRB ICF in different scenarios is described in detail in the foregoing embodiments respectively. Corresponding network equipment is described in the following embodiments with reference to accompanying drawings.

Figure 2:
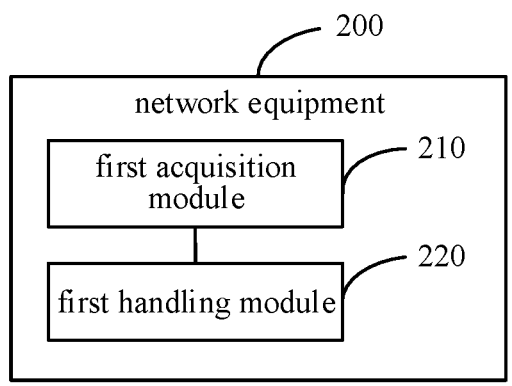
FIG. 2 illustrates a schematic module diagram of network equipment provided by embodiments of the present disclosure.

As shown in FIG. 2, network equipment 200 provided by the embodiment of the present disclosure may implement the detail of the method of acquiring the ICF event of the DRB established to the terminal and performing, according to the ICF event, the predetermined handling operation, and achieve the same effect. The network equipment 200 specifically includes the following functional modules: a first acquisition module 210, configured to acquire an ICF event of a DRB for a terminal; and a first handling module 220, configured to perform a predetermined handling operation according to the ICF event.

The first acquisition module 210 includes: a first detection sub-module, configured to detect a DRB between the first network equipment and the terminal; and a first generation module, configured to trigger a generation of the ICF event, in case that it is detected that an ICF occurs to the DRB between the terminal and the second network equipment.

The first handling module 220 includes: a first handling sub-module, configured to, after the generation of the ICF event, perform at least one of following handling operations: releasing the DRB between the first network equipment and the terminal, or transmitting, to second network equipment, or first feedback information for indicating the ICF event. The first network equipment is one of a master network node and a secondary network node for the terminal, and the second network equipment is the other one of the master network node and the secondary network node for the terminal.

The first handling module 220 further includes: a first reception sub-module, configured to receive second feedback information transmitted by the second network equipment when the first network equipment is the master network node; where the second feedback information is transmitted by the second network equipment after the second network equipment releases a DRB between the second network equipment and the terminal according to the first feedback information; and a second handling sub-module, configured to reconfigure a DRB between the second network equipment and the terminal after the second feedback information is received, and transmit corresponding configuration information to the second network equipment.

The first handling sub-module includes: when the first network equipment is the secondary network node, releasing the DRB between the first network equipment and the terminal; or releasing a wireless link connection between the first network equipment and the terminal; or triggering a handover procedure to other secondary network node.

The first feedback information includes at least one of: information about the failure DRB between the first network equipment and the terminal, or information about a reason for that the first network equipment releases the DRB between the first network equipment and the terminal.

The information about the failure DRB includes at least one of: first indication information for indicating whether the DRB is a split DRB; identification information of the DRB; identification information of a logical channel corresponding to the DRB; second indication information for indicating an uplink DRB failure; or third indication information for indicating a downlink DRB failure.

The first acquisition module 210 further includes: a second reception sub-module, configured to receive third feedback information for indicating the ICF event that is transmitted by second network equipment; where the third feedback information is transmitted by the second network equipment after the second network equipment detects an ICF of a DRB between the second network equipment and the terminal; the first network equipment is one of a master network node and a secondary network node for the terminal, and the second network equipment is the other one of the master network node and the secondary network node for the terminal.

The third feedback information includes at least one of: information about the failure DRB between the second network equipment and the terminal, or information about a reason for that the second network equipment releases the DRB between the second network equipment and the terminal.

The first handling module 220 includes: a third handling sub-module, configured to, when the first network equipment is the secondary network node, release, according to the ICF event of the DRB indicated by the third feedback information, the DRB corresponding to the ICF event and feed the releasing of the DRB back to the second network equipment.

The first handling module 220 further includes: a fourth handling sub-module, configured to, when the first network equipment is the master network node, after the third feedback information transmitted by the second network equipment is received, perform at least one of following handling operations: triggering a packet counting and checking procedure between the first network equipment and the terminal; releasing the DRB between the first network equipment and the terminal; triggering an integrity protection procedure of the DRB between the first network equipment and the terminal; releasing a wireless link connection or the DRB between the second network equipment and the terminal; reconfiguring a wireless link connection between the second network equipment and the terminal; or triggering a handover procedure between the second network equipment and other secondary network node.

The first acquisition module 210 includes: a third reception sub-module, configured to receive fourth feedback information for indicating the ICF event that is transmitted by second network equipment; where the fourth feedback information is transmitted by the second network equipment after the second network equipment detects an ICF of a DRB between the second network equipment and the terminal during a procedure of a handover; a fifth handling sub-module, configured to instruct, according to the ICF event indicated by the fourth feedback information, the terminal to retransmit corresponding packets, after a connection is established between the first network equipment and the terminal; the first network equipment is a master network node or secondary network node after the handover, and the second network equipment is a master network node or secondary network node before the handover.

The first acquisition module 210 includes: a fourth reception sub-module, configured to receive fifth feedback information for indicating the ICF event that is transmitted by the terminal; where the fifth feedback information is transmitted by the terminal after the terminal detects an ICF of a DRB between the terminal and second network equipment; the first network equipment is one of a master network node and a secondary network node for the terminal, and the second network equipment is the other one of the master network node and the secondary network node for the terminal.

The fifth feedback information includes information about the failure DRB between the first network equipment and the terminal; and the information about the failure DRB includes at least one of: first indication information for indicating whether the DRB is a split DRB; identification information of the DRB; or identification information of a logical channel corresponding to the DRB.

The first acquisition module 210 further includes: a first transmission sub-module, configured to transmit, to the second network equipment, indication information for indicating the ICF event.

The first handling module includes: a sixth handling sub-module, configured to, when the first network equipment is the secondary network node, after the fifth feedback information transmitted by the terminal is received, perform at least one of following handling operations: requesting the second network equipment to release a wireless link connection or the DRB between the second network equipment and the terminal; triggering an integrity protection procedure of a DRB between the first network equipment and the terminal; or requesting the second network equipment to reconfigure a wireless link connection between the second network equipment and the terminal.

The first handling module 220 further includes: a seventh handling sub-module, configured to, when the first network equipment is the master network node, after the fifth feedback information transmitted by the terminal is received, perform at least one of following handling operations: triggering a packet counting and checking procedure between the first network equipment and the terminal; triggering an integrity protection procedure of a DRB between the first network equipment and the terminal; releasing a wireless link connection or the DRB between the second network equipment and the terminal; reconfiguring a wireless link connection between the second network equipment and the terminal; or triggering a handover procedure between the second network equipment and other secondary network node.

It is noted that, by acquiring the ICF event of the DRB established to the terminal, and further performing, according to the ICF event, the predetermined handling operation configured to protect data integrity, the network equipment according to the embodiments of the present disclosure achieves an intact data transmission over the DRB, thereby improving the transmission reliability of network.

To better achieve the foregoing objective, embodiments of the present disclosure further provide a network equipment. The network equipment includes a processor, a storage and a computer program stored in the storage, where the computer program is executed by the processor, to implement steps of the method for handling DRB ICF as described above. Embodiments of the present disclosure further provide a computer readable storage medium storing therein a computer program, where the computer program is configured to be executed by a processor, to implement steps of the method for handling DRB ICF as described above.

Figure 3:
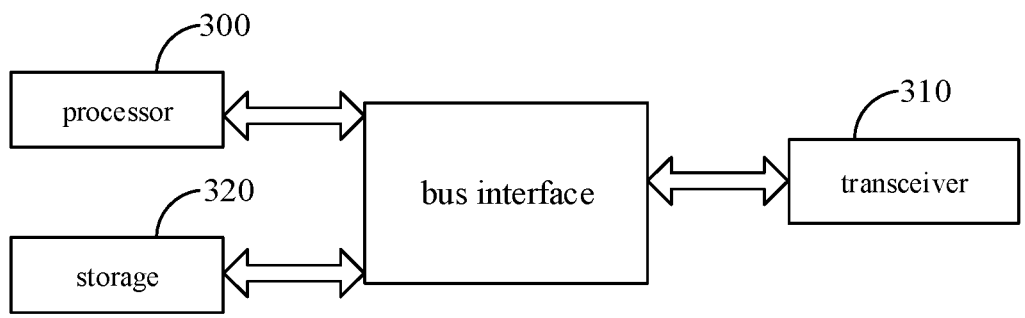
FIG. 3 illustrates a block diagram of network equipment provided by embodiments of the present disclosure.

In specific, as shown in FIG. 3, embodiments of the present disclosure further provide network equipment. The network equipment includes: a processor 300, a storage 320 connected to the processor 300 via a bus interface, and a transceiver 310 connected to the processor 300 via the bus interface. The storage 320 is configured to store program and data used by the processor during operations. The transceiver 310 is configured to transmit data information or a pilot signal and receive an uplink control channel. The processor 300 is configured to call and execute the program and the data stored in the storage 320.

Specifically, the processor 300 is configured to read the program in the storage 320 to implement following functions: acquiring an ICF event of a DRB for a terminal; and performing a predetermined handling operation according to the ICF event.

The transceiver 310 is configured to receive and transmit data under the control of the processor 300.

In FIG. 3, a bus architecture may include any number of interconnected buses and bridges, and may be specifically configured to couple various circuits including one or more processors represented by the processor 300 and storages represented by the storage 320. The bus architecture may also couple various other circuits such as peripherals, voltage regulators and power management circuits, which are well known in the art. Therefore, a detailed description thereof is omitted herein. A bus interface provides an interface. The transceiver 310 may be multiple elements, i.e., including a transmitter and a receiver, to allow for communication with various other apparatuses on the transmission medium. The processor 300 is responsible for supervising the bus architecture and normal operation and the storage 320 may store the data used by the processor 300 during operation.

In specific, the processor 300 is further configured to: detect a DRB between the first network equipment and the terminal; and trigger a generation of the ICF event, in case that an ICF of the DRB between the first network equipment and the terminal is detected.

In specific, the processor 300 is further configured to: after the generation of the ICF event, perform at least one of following handling operations: releasing the DRB between the first network equipment and the terminal, or transmitting, to second network equipment, first feedback information for indicating the ICF event. The first network equipment is one of a master network node and a secondary network node for the terminal, and the second network equipment is the other one of the master network node and the secondary network node for the terminal.

When the first network equipment is the master network node, the processor 300 is further configured to: receive second feedback information transmitted by the second network equipment, where the second feedback information is transmitted by the second network equipment after the second network equipment releases a DRB between the second network equipment and the terminal according to the first feedback information; reconfigure a DRB between the second network equipment and the terminal after the second feedback information is received, and transmit corresponding configuration information to the second network equipment.

In specific, when the first network equipment is the secondary network node, the processor 300 is further configured to: release the DRB between the first network equipment and the terminal; or release a wireless link connection between the first network equipment and the terminal; or trigger a handover procedure to other secondary network node.

In specific, the first feedback information includes at least one of: information about the failure DRB between the first network equipment and the terminal, or information about a reason for that the first network equipment releases the DRB between the first network equipment and the terminal.

In specific, the information about the failure DRB includes at least one of: first indication information for indicating whether the DRB is a split DRB; identification information of the DRB; identification information of a logical channel corresponding to the DRB; second indication information for indicating an uplink DRB failure; or third indication information for indicating a downlink DRB failure.

In specific, the processor 300 is further configured to: receive third feedback information for indicating the ICF event that is transmitted by second network equipment; the third feedback information is transmitted by the second network equipment after the second network equipment detects an ICF of a DRB between the second network equipment and the terminal; the first network equipment is one of a master network node and a secondary network node for the terminal, and the second network equipment is the other one of the master network node and the secondary network node for the terminal.

In specific, the third feedback information includes at least one of: information about the failure DRB between the second network equipment and the terminal, or information about a reason for that the second network equipment releases the DRB between the second network equipment and the terminal.

In specific, when the first network equipment is the secondary network node, the processor 300 is further configured to: release, according to the ICF event of the DRB indicated by the third feedback information, the DRB corresponding to the ICF event and feed the releasing of the DRB back to the second network equipment.

In specific, when the first network equipment is the master network node, the processor 300 is further configured to: after the third feedback information transmitted by the second network equipment is received, perform at least one of following handling operations: triggering a packet counting and checking procedure between the first network equipment and the terminal; releasing the DRB between the first network equipment and the terminal; triggering an integrity protection procedure of the DRB between the first network equipment and the terminal; releasing a wireless link connection or the DRB between the second network equipment and the terminal; reconfiguring a wireless link connection between the second network equipment and the terminal; or triggering a handover procedure between the second network equipment and other secondary network node.

In specific, the processor 300 is further configured to: receive fourth feedback information for indicating the ICF event that is transmitted by second network equipment, where the fourth feedback information is transmitted by the second network equipment after the second network equipment detects an ICF of a DRB between the second network equipment and the terminal during a handover procedure; and instruct, according to the ICF event indicated by the fourth feedback information, the terminal to retransmit corresponding packets, after a connection is established between the first network equipment and the terminal. The first network equipment is a master network node or secondary network node after the handover, and the second network equipment is a master network node or secondary network node before the handover.

In specific, the processor 300 is further configured to: receive fifth feedback information for indicating the ICF event that is transmitted by the terminal; the fifth feedback information is transmitted by the terminal after the terminal detects an ICF of a DRB between the terminal and second network equipment; the first network equipment is one of a master network node and a secondary network node for the terminal, and the second network equipment is the other one of the master network node and the secondary network node for the terminal.

In specific, the processor 300 is further configured in a manner that the fifth feedback information includes information about the failure DRB between the first network equipment and the terminal; and the information about the failure DRB includes at least one of: first indication information for indicating whether the DRB is a split DRB; identification information of the DRB; or identification information of a logical channel corresponding to the DRB.

In specific, the processor 300 is further configured to: transmit, to the second network equipment, indication information for indicating the ICF event.

In specific, when the first network equipment is the secondary network node, the processor 300 is further configured to: after the fifth feedback information transmitted by the terminal is received, perform at least one of following handling operations: requesting the second network equipment to release a wireless link connection or the DRB between the second network equipment and the terminal; triggering an integrity protection procedure of a DRB between the first network equipment and the terminal; or requesting the second network equipment to reconfigure a wireless link connection between the second network equipment and the terminal.

In specific, when the first network equipment is the master network node, the processor 300 is further configured to: after the fifth feedback information transmitted by the terminal is received, perform at least one of following handling operations: triggering a packet counting and checking procedure between the first network equipment and the terminal; triggering an integrity protection procedure for a DRB between the first network equipment and the terminal; releasing a wireless link connection or the DRB between the second network equipment and the terminal; reconfiguring a wireless link connection between the second network equipment and the terminal; or triggering a handover procedure between the second network equipment and other secondary network node.

The network equipment may be a global system of mobile communication (GSM) or code division multiple access (CDMA) base transceiver station (BTS), or a wideband code division multiple access (WCDMA) NodeB (NB), or a LTE evolutional Node B (eNB or eNodeB), or a relay station or access point, or a future 5G network base station, etc., which is not limited herein.

In this way, by acquiring the ICF event of the DRB for the terminal, and further performing, according to the ICF event, the predetermined handling operation configured to protect data integrity, the network equipment enables an intact data transmission over the DRB, thereby improving the transmission reliability of network.

The method for handling DRB ICF applied to a network equipment side according to the present disclosure is described in the foregoing embodiments. A method for handling DRB ICF applied to a terminal side is further described in the following embodiments with reference to accompanying drawings.

Figure 4:
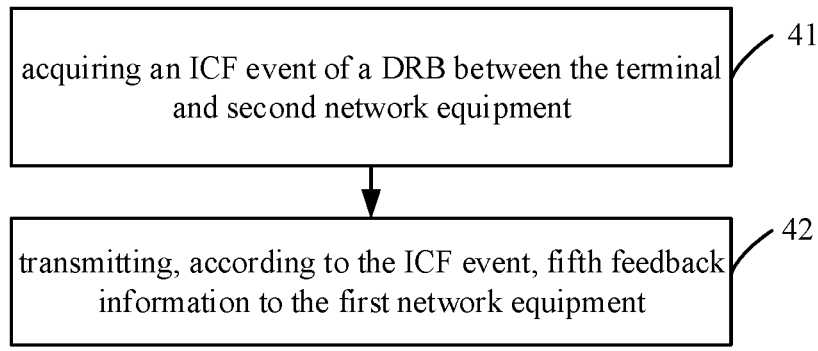
FIG. 4 illustrates a schematic flow chart of a method for handling DRB ICF, applied to a terminal side, provided by embodiments of the present disclosure.

As shown in FIG. 4, the method for handling DRB ICF according to embodiments of the present disclosure, applied to a terminal side, specifically includes the following steps 41 and 42.

Step 41: acquiring an ICF event of a DRB between the terminal and second network equipment.

In specific, the step 41 includes: detecting the DRB between the terminal and the second network equipment; and triggering a generation of the ICF event, in case that it is detected that an ICF occurs to the DRB between the terminal and the second network equipment is detected.

Step 42: transmitting, according to the ICF event, fifth feedback information to the first network equipment.

The fifth feedback information is transmitted by the terminal after the terminal detects an ICF of a DRB between the terminal and second network equipment, and includes specifically information about the failure DRB between the second network equipment and the terminal. The information about the failure DRB includes at least one of: first indication information for indicating whether the DRB is a split DRB; identification information of the DRB; or identification information of a logical channel corresponding to the DRB.

The first network equipment is one of a master network node and a secondary network node for the terminal, and the second network equipment is the other one of the master network node and the secondary network node for the terminal.

The step 42 includes specifically: after the generation of the ICF event, stopping transmitting data over the DRB between the terminal and the second network equipment, and transmitting, to the first network equipment, DRB information corresponding to the ICF event. Assuming the first network equipment is the master network node and the second network equipment is the secondary network node, after an ICF of the DRB between the terminal and the secondary network node is detected, the terminal reports the ICF event to the master network node, such that the master network node performs the operations of the foregoing embodiments to recover a DRB for the terminal as soon as possible.

The information about the failure DRB includes at least one of: first indication information for indicating whether the DRB is a split DRB; identification information of the DRB; or identification information of a logical channel corresponding to the DRB.

According to the method for handling DRB ICF provided by embodiments of the present disclosure, the terminal detects an ICF of the DRB between the terminal and the second network equipment, and in case that an ICF event occurs to the DRB, further reports the ICF event to the first network equipment so that the first network equipment may perform the predetermined handling operation timely. In such a manner, a rapid recovery of DRBs is achieved, thereby improving the transmission reliability of networks.

The method for handling DRB ICF in different scenarios is described in detail in the foregoing embodiments. Corresponding terminal is described hereinafter with reference to accompanying drawings.

Figure 5:
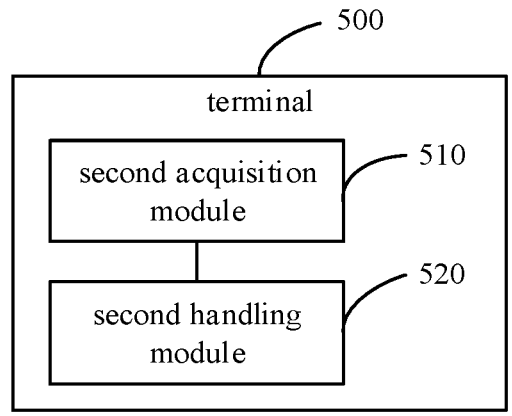
FIG. 5 illustrates a schematic module diagram of a terminal provided by embodiments of the present disclosure.

As shown in FIG. 5, a terminal 500 provided by the embodiments of the present disclosure may implement the detail of the method of acquiring the ICF event of the DRB between the terminal and the second network equipment and transmitting, according to the ICF event, the fifth feedback information to the first network equipment, and achieve the same effect. The first network equipment is one of a master network node and a secondary network node for the terminal, and the second network equipment is the other one of the master network node and the secondary network node for the terminal. The terminal 500 includes specifically following functional modules: a second acquisition module 510, configured to acquire an ICF event of a DRB between the terminal and second network equipment; a second handling module 520, configured to transmit, according to the ICF event, fifth feedback information to the first network equipment; where, the first network equipment is one of a master network node and a secondary network node for the terminal, and the second network equipment is the other one of the master network node and the secondary network node for the terminal.

The second acquisition module includes: a second detection sub-module, configured to detect an ICF of the DRB between the terminal and the second network equipment; and a second generation sub-module, configured to trigger a generation of the ICF event, in case that the ICF of the DRB between the terminal and the second network equipment is detected.

The second handling module includes: an eighth handling sub-module, configured to, after the generation of the ICF event, stop transmitting data over the DRB between the terminal and the second network equipment, and transmit, to the first network equipment, DRB information corresponding to the ICF event.

The information about the failure DRB includes at least one of: first indication information for indicating whether the DRB is a split DRB; identification information of the DRB; or identification information of a logical channel corresponding to the DRB.

It is noted, by detecting the DRB between the terminal and the second network equipment, and in case that an ICF event occurs to the DRB, further reporting the ICF event to the first network equipment so that the first network equipment may perform the predetermined handling operation timely, the terminal according to the embodiments of the present disclosure enables a rapid recovery of DRB, thereby improving the transmission reliability of network.

It is understood that, the modular division of the network equipment and the terminal is merely a logical function division, and in actual implementation the modules may be integrated entirely or partly on one physical entity or physically separated. These modules may be entirely implemented in form of software that may be called and executed by a processing element, or entirely implemented in form of hardware, or partly implemented in form of software that may be called and executed by a processing element and partly implemented in form of hardware. For example, a determination module may be a standalone processing element, or integrated in a chip of the device, or may be stored in a storage of the device in form of program code which is configured to be called by a processing element of the device to implement the function of the determination module. Other modules may be implemented in a similar way. In addition, the modules may be entirely or partly integrated together, or implemented separately. The described processing element may be an integrated circuit with signal processing capability. During an implementation process, steps of the methods or the modules may be realized in form of hardware by integrated logical circuits in the processing element, or in form of software by instructions.

For example, these modules may be one or more integrated circuits (IC) configured to implement the foregoing methods, e.g., one or more Application Specific Integrated Circuits (ASIC), one or more Digital Signal Processors (DSP), or one or more Field-Programmable Gate Arrays (FPGA), etc. For another example, when a module is implemented in form of program code configured to be called by a processing element, the processing element may be a general purpose processor, e.g., a central processing unit (CPU) or other processor configured to call program code. For another example, these modules may be integrated together in form of a system-on-a-chip (SOC).

To better achieve the foregoing objective, embodiments of the present disclosure further provide a terminal. The terminal includes a processor, a storage and a computer program stored in the storage and executable by the processor. When executing the computer program, the processor is configured to implement steps of the method for handling DRB ICF as described above. Embodiments of the present disclosure further provide a computer readable storage medium storing therein a computer program, where the computer program is executed by a processor, to implement steps of the method for handling DRB ICF as described above.

Figure 6:
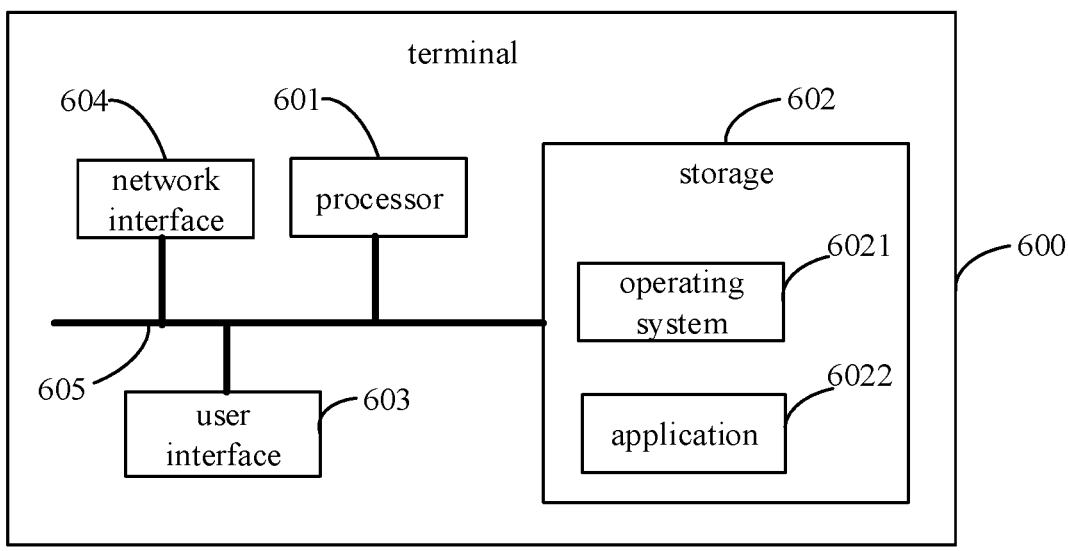
FIG. 6 illustrates a block diagram of a terminal provided by embodiments of the present disclosure.

In specific, FIG. 6 is a block diagram of a terminal 600 provided by another embodiment of the present disclosure. As shown in FIG. 6, the terminal includes: at least one processor 601, storage 602, user interface 603 and network interface 604. Various components in the terminal 600 are coupled to each other via a bus system 605. It is understood that the bus system 605 is configured to enable connections and communication among these components. In addition to the data bus, the bus system 605 includes a power bus, a control bus and a status signal bus. For clarity, various buses are all labeled as the bus system 605 in FIG. 6.

The user interface 603 may include a display, or a click device (e.g., a touchpad), or a touch screen, etc.

It is understood that, the storage 602 provided by embodiments of the present disclosure may be a volatile or non-volatile storage, or may include both of the volatile and non-volatile storages. The non-volatile storage may be a read-only memory (ROM), a programmable ROM (PROM), an erasable PROM (EPROM), an electrically EPROM (EEPROM) or a flash memory. The volatile storage may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The storage 602 of the system and method described herein is meant to include, without limitation, these and any other suitable types of storages.

In some implementations, the storage 602 stores following elements: executable module or data structure, or a subset or extension set thereof, such as an operating system 6021 and an application 6022.

The operating system 6021 includes various system programs, such as framework layer programs, core library layer programs and driver layer programs, to implement various fundamental services and process hardware-based tasks. The application 6022 includes various applications, such as media player and browser, to implement a variety of application services. The program implementing the method according to embodiments of the present disclosure may be included in the application 6022.

In embodiments of the present disclosure, the terminal 600 may include: a computer program stored in the storage 602 and executable by the processor 601, specifically, a computer program in the application 6022. The computer program is configured to be executed by the processor 601 to implement following steps: acquiring an ICF event of a DRB between the terminal and second network equipment; and transmitting, according to the ICF event, fifth feedback information to the first network equipment. The first network equipment is one of a master network node and a secondary network node for the terminal, and the second network equipment is the other one of the master network node and the secondary network node for the terminal.

The method disclosed in the foregoing embodiments of the present disclosure may be applied to the processor 601 or implemented by the processor 601. The processor 601 may be an integrated circuit with signal processing capability. During an implementation process, steps of the methods may be realized in form of hardware by integrated logical circuits in the processor 601, or in form of software by instructions. The processor 601 may be a general purpose processor, digital signal processor (DSP), application specific integrated circuit (ASIC), field programmable gate array (FPGA) or other programmable logic device, discrete gate or transistor logic device, discrete hardware transistor logic device, discrete hardware component, that is capable of implementing or executing the various methods, steps and logic block diagrams disclosed in the embodiments of the present disclosure. The general purpose processor may be a microprocessor, or any conventional processor, etc. The steps of the methods disclosed with reference to the embodiments of the present disclosure may be embodied in hardware in the form of a coding processor, or performed by the hardware in the coding processor and the software modules in combination. The software modules may reside in well-established storage medium in the art, such as a RAM, flash memory, ROM, PROM or EEPROM, register, etc. The storage medium resides in the storage 602. The processor 601 reads information from the storage 602 and performs the steps of the methods with its hardware.

It is understood that, the embodiments described in the present disclosure may be implemented by hardware, software, firmware, middleware, microcode or a combination thereof. For hardware implementation, processing units may be implemented in one or more application specific integrated circuits (ASIC), digital signal processor (DSP), DSP device (DSPD), programmable logic device (PLD), field-programmable gate array (FPGA), general purpose processor, controller, microcontroller, microprocessor, other electronic unit configured to perform the function described in this application or a combination thereof.

For software implementation, the technical solutions described in the embodiments of the present disclosure may be implemented by a module (e.g., process, function, etc.) configured to perform the function described in the embodiments of the present disclosure. Software code may be stored in a storage and executed by the processor. The storage may be implemented internal or external to the processor.

In specific, the computer program is configured to be executed by the processor 601 to implement following steps: detecting a DRB between the terminal and the second network equipment; and triggering a generation of the ICF event, in case that it is detected that an ICF occurs to the DRB between the terminal and the second network equipment.

In specific, the computer program is configured to be executed by the processor 601 to implement following steps: after the generation of the ICF event, stopping transmitting data over the DRB between the terminal and the second network equipment, and transmitting, to the first network equipment, DRB information corresponding to the ICF event.

In specific, information about the failure DRB includes at least one of: first indication information for indicating whether the DRB is a split DRB; identification information of the DRB; or identification information of a logical channel corresponding to the DRB.

The terminal may be a wireless terminal or a wired terminal. A wireless terminal may refer to a device used to provide voice and/or other service data connectivity to a user, a hand-held device with a wireless connection function, or another processing device connected to a wireless modem. A wireless terminal may communicate with one or more core networks via a radio access network (RAN). The wireless terminal may be a mobile terminal, such as a mobile phone (also called cellphone) or a computer equipped with a mobile terminal, such as a portable, pocket-sized, hand-held, computer built-in, or vehicle-mounted mobile device, which exchanges voice and/or data with the radio access network. For example, it may be a personal communication service (PCS) phone, a cordless phone, a session initiation protocol (SIP) phone, a wireless local loop (WLL) station, a personal digital assistant (PDA), or the like. A wireless terminal may also be referred to as a system, a subscriber unit, a subscriber station, a mobile station, a mobile, a remote station, a remote terminal, an access terminal, a user terminal, a user agent, or a user device or user equipment, and is not limited herein.

By detecting the DRB between the terminal and the second network equipment, and in case that an ICF event occurs to the DRB, and further reporting the ICF event to the first network equipment so that the first network equipment may perform the predetermined handling operation timely, the terminal according to embodiments of the present disclosure enables a rapid recovery of DRB, thereby improving the transmission reliability of network.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, essential part or the part contributing to the prior art of the technical solutions of the present disclosure, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the disclosure. The foregoing storage medium includes any medium that may store program code, such as a universal serial bus (USB) flash drive, a mobile hard disk, an ROM, an RAM, a magnetic disk, or an optical disc.

Further, it is noted, apparently, the components or steps in the apparatus and method of the present disclosure may be subdivided and/or recombined. These subdivisions and/or recombinations should be considered as equivalent solutions to the present disclosure. Moreover, the steps of the foregoing series of process may be performed naturally in a chronological order in which the steps are described, however, the steps are not necessarily performed in the chronological order. Instead, some steps may be performed concurrently or independently of each other. It is appreciated by a person of ordinary skill in the art that, all or any steps or components of the method and apparatus of the present disclosure may be implemented in form of hardware, firmware, software or a combination thereof in any computing device (including a processor, storage medium or the like) or a network of computing devices, which may be realized by a person of ordinary skill in the art, having read the description of the present disclosure, and using basic programming skills.

Therefore, the objective of the present disclosure may further be achieved by running a program or a group of programs on any computing device. The computing device may be a well-known general-purpose device. Thus, the objective of the present disclosure may further be achieved by providing a program product including program codes configured to implement the method or apparatus. In other words, such a program product constitutes the present disclosure, and a storage medium storing such a program product also constitutes the present disclosure. Obviously, the storage medium may be any well-known storage medium or any storage medium to be developed in the future. It is also noted, apparently, the components or steps in the apparatus and method of the present disclosure may be subdivided and/or recombined. These subdivisions and/or recombinations should be considered as equivalent solutions to the present disclosure. Moreover, the steps of the foregoing series of process may be performed naturally in a chronological order in which the steps are described, however, the steps are not necessarily performed in the chronological order. Instead, some steps may be performed concurrently or independently of each other.

The above descriptions merely describe optional implementations of the present disclosure. It should be noted that, numerous modifications and improvements may be made by a person of ordinary skill in the art without departing from the principle of the present disclosure, and these modifications and improvements shall fall within the scope of the present disclosure.

What is claimed is:

1. A method for handling data radio bearer (DRB) integrity check failure (ICF), applied to a first network equipment, comprising:
   acquiring an ICF event of a DRB for a terminal; and
   performing a predetermined handling operation according to the ICF event,
   wherein:
   the acquiring the ICF event of the DRB for the terminal comprises: detecting the DRB between the first network equipment and the terminal; and triggering a generation of the ICF event, in case that it is detected that an ICF occurs to the DRB between the first network equipment and the terminal,
   wherein the performing the predetermined handling operation according to the ICF event comprises performing, after the generation of the ICF event, at least one of following handling operations:
     releasing the DRB between the first network equipment and the terminal, or transmitting, to a second network equipment, first feedback information for indicating the ICF event, wherein the first network equipment is one of a master network node and a secondary network node for the terminal, and the second network equipment is the other one of the master network node and the secondary network node for the terminal,
   wherein, when the first network equipment is the master network node, and after transmitting, to the second network equipment, the first feedback information for indicating the ICF event, the method further comprises:
   receiving second feedback information transmitted by the second network equipment wherein the second feedback information is transmitted by the second network equipment after the second network equipment releases a DRB between the second network equipment and the terminal according to the first feedback information; and
   reconfiguring a DRB between the second network equipment and the terminal after the second feedback information is received, and transmitting corresponding configuration information to the second network equipment, or
   wherein, when the first network equipment is the secondary network node, the releasing the DRB for the terminal comprises:
   releasing the DRB between the first network equipment and the terminal; or
   releasing a wireless link connection between the first network equipment and the terminal; or triggering a handover procedure between the first network equipment and other secondary network node;
or,
wherein the acquiring the ICF event of the DRB for the terminal comprises: receiving third feedback information for indicating the ICF event that is transmitted by a second network equipment; wherein the third feedback information is transmitted by the second network equipment after the second network equipment detects an ICF of a DRB between the second network equipment and the terminal, wherein the first network equipment is one of a master network node and a secondary network node for the terminal, and the second network equipment is the other one of the master network node and the secondary network node for the terminal;
or,
wherein the acquiring the ICF event of the DRB for the terminal comprises:
receiving fourth feedback information for indicating the ICF event that is transmitted by a second network equipment wherein the fourth feedback information is transmitted by the second network equipment after the second network equipment detects an ICF of a DRB between the second network equipment and the terminal during a procedure of a handover; and
instructing, according to the ICF event indicated by the fourth feedback information, the terminal to retransmit a corresponding packet, when a connection is established between the first network equipment and the terminal;
wherein the first network equipment is a master network node after the handover or a secondary network node after the handover, and the second network equipment is a master network node before the handover or a secondary network node before the handover,
or,
wherein the acquiring the ICF event of the DRB for the terminal comprises: receiving fifth feedback information for indicating the ICF event that is transmitted by the terminal; wherein the fifth feedback information is transmitted by the terminal after the terminal detects an ICF of a DRB between the terminal and a second network equipment, wherein the first network equipment is one of a master network node and a secondary network node for the terminal, and the second network equipment is the other one of the master network node and the secondary network node for the terminal.

2. The method for handling the DRB ICF according to claim 1, wherein the first feedback information comprises at least one of:
   information about a failure DRB between the first network equipment and the terminal, or
   information about a reason for that the first network equipment releases the DRB between the first network equipment and the terminal.

3. The method for handling the DRB ICF according to claim 1, wherein the third feedback information comprises at least one of:
   information about the failure DRB between the second network equipment and the terminal, or
   information about a reason for that the second network equipment releases the DRB between the second network equipment and the terminal.

4. The method for handling the DRB ICF according to claim 1, wherein the fifth feedback information comprises information about the failure DRB between the second network equipment and the terminal, and the information about the failure DRB comprises at least one of:
first indication information for indicating whether the DRB is a split DRB;
identification information of the DRB; or
identification information of a logical channel corresponding to the DRB; or
wherein, after receiving the fifth feedback information for indicating the ICF event that is transmitted by the terminal, the method further comprises:
transmitting, to the second network equipment, indication information for indicating the ICF event.

5. The method for handling the DRB ICF according to claim 4, wherein, when the first network equipment is the secondary network node, the performing the predetermined handling operation according to the ICF event comprises:
performing, after the fifth feedback information transmitted by the terminal is received, at least one of following handling operations:
requesting the second network equipment to release a wireless link connection or the DRB between the second network equipment and the terminal,
triggering an integrity protection procedure for a DRB between the first network equipment and the terminal; or
requesting the second network equipment to reconfigure a wireless link connection between the second network equipment and the terminal, or
wherein, when the first network equipment is the master network node, the performing the predetermined handling operation according to the ICF event comprises:
performing, after the fifth feedback information transmitted by the terminal is received, at least one of following handling operations:
triggering a packet counting and checking procedure between the first network equipment and the terminal;
triggering an integrity protection procedure for a DRB between the first network equipment and the terminal;
releasing a wireless link connection or the DRB between the second network equipment and the terminal;
reconfiguring a wireless link connection between the second network equipment and the terminal; or
triggering a handover procedure between the second network equipment and other secondary network node.

6. The method for handling the DRB ICF according to claim 1, wherein, when the first network equipment is the secondary network node, the performing the predetermined handling operation according to the ICF event comprises:
releasing, according to the ICF event of the DRB indicated by the third feedback information, the DRB corresponding to the ICF event; and
feeding the releasing of the DRB back to the second network equipment.

7. The method for handling the DRB ICF according to claim 1, wherein, when the first network equipment is the master network node, the performing the predetermined handling operation according to the ICF event further comprises:
performing, after the third feedback information transmitted by the second network equipment is received, at least one of following handling operations:
triggering a packet counting and checking procedure between the first network equipment and the terminal;
releasing the DRB between the first network equipment and the terminal;
triggering an integrity protection procedure for the DRB between the first network equipment and the terminal;
releasing a wireless link connection or the DRB between the second network equipment and the terminal;
reconfiguring a wireless link connection between the second network equipment and the terminal; or
triggering a handover procedure between the second network equipment and other secondary network node.

8. A non-transitory computer-readable storage medium, storing therein a computer program, wherein when executing the computer program, a processor is configured to implement steps of the method for handling the DRB ICF according to claim 1.

9. A network equipment, applied to a first network equipment, comprising:
a processor, a storage and a program stored in the storage, wherein when executing the program, the processor is configured to:
acquire an ICF event of a DRB for a terminal; and
perform a predetermined handling operation according to the ICF event,
wherein:
the processor is configured to:
detect the DRB between the first network equipment and the terminal;
trigger a generation of the ICF event, in case that it is detected that an ICF occurs to the DRB between the first network equipment and the terminal; and
perform, after the generation of the ICF event, at least one of following handling operations:
releasing the DRB between the first network equipment and the terminal, or transmitting, to a second network equipment, first feedback information for indicating the ICF event, wherein, the first network equipment is one of a master network node and a secondary network node for the terminal, and the second network equipment is the other one of the master network node and the secondary network node for the terminal, and
wherein when the first network equipment is the master network node, the processor is configured to:
receive second feedback information transmitted by the second network equipment; wherein the second feedback information is transmitted by the second network equipment after the second network equipment releases a DRB between the second network equipment and the terminal according to the first feedback information; and
reconfigure a DRB between the second network equipment and the terminal after the second feedback information is received, and transmit corresponding configuration information to the second network equipment, or
wherein when the first network equipment is the secondary network node, the processor is configured to:
release the DRB between the first network equipment and the terminal; or
release a wireless link connection between the first network equipment and the terminal; or
trigger a handover procedure between the first network equipment and other secondary network node;
or,
wherein the processor is further configured to: receive third feedback information for indicating the ICF event that is transmitted by second network equipment wherein the third feedback information is transmitted by the second network equipment after the second network equipment detects an ICF of a DRB between the second network equipment and the terminal, wherein, the first network equipment is one of a master network node and a secondary network node for the terminal, and the second network equipment is the other one of the master network node and the secondary network node for the terminal;

or, wherein the processor is configured to:

receive fourth feedback information for indicating the ICF event that is transmitted by a second network equipment; wherein the fourth feedback information is transmitted by the second network equipment after the second network equipment detects an ICF of a DRB between the second network equipment and the terminal during a procedure of a handover; and instruct, according to the ICF event indicated by the fourth feedback information, the terminal to retransmit a corresponding packet, after a connection is established between the first network equipment and the terminal, wherein, the first network equipment is a master network node after the handover or a secondary network node after the handover, and the second network equipment is a master network node before the handover or a secondary network node before the handover;

or, wherein the processor is configured to: receive fifth feedback information for indicating the ICF event that is transmitted by the terminal; wherein the fifth feedback information is transmitted by the terminal after the terminal detects an ICF of a DRB between the terminal and a second network equipment, wherein the first network equipment is one of a master network node and a secondary network node for the terminal, and the second network equipment is the other one of the master network node and the secondary network node for the terminal.

10. The network equipment according to claim 9, wherein the third feedback information comprises at least one of:

information about a failure DRB between the second network equipment and the terminal, or information about a reason for that the second network equipment releases the DRB between the second network equipment and the terminal.

11. The network equipment according to claim 9, wherein, when the first network equipment is the secondary network node, the performing the predetermined handling operation according to the ICF event comprises:

releasing, according to the ICF event of the DRB indicated by the third feedback information, the DRB corresponding to the ICF event; and feeding the releasing of the DRB back to the second network equipment.

12. The network equipment according to claim 9, wherein, when the first network equipment is the master network node, the performing the predetermined handling operation according to the ICF event comprises:

performing, after the third feedback information transmitted by the second network equipment is received, at least one of following handling operations:

triggering a packet counting and checking procedure between the first network equipment and the terminal;

releasing the DRB between the first network equipment and the terminal;

triggering an integrity protection procedure for the DRB between the first network equipment and the terminal;

releasing a wireless link connection or the DRB between the second network equipment and the terminal;

reconfiguring a wireless link connection between the second network equipment and the terminal; or triggering a handover procedure between the second network equipment and other secondary network node.

13. The network equipment according to claim 9, wherein, the fifth feedback information comprises information about the failure DRB between the second network equipment and the terminal, and the information about the failure DRB comprises at least one of:

first indication information for indicating whether the DRB is a split DRB;

identification information of the DRB; or identification information of a logical channel corresponding to the DRB.

14. The network equipment according to claim 9, wherein, after receiving the fifth feedback information for indicating the ICF event that is transmitted by the terminal, the processor is configured to: transmit, to the second network equipment, indication information for indicating the ICF event.

15. The network equipment according to claim 14, wherein when the first network equipment is the secondary network node, and after the fifth feedback information transmitted by the terminal is received, the processor is configured to perform at least one of following handling operations:

requesting the second network equipment to release a wireless link connection or the DRB between the second network equipment and the terminal;

triggering an integrity protection procedure for a DRB between the first network equipment and the terminal; or requesting the second network equipment to reconfigure a wireless link connection between the second network equipment and the terminal.

16. The network equipment according to claim 14, wherein, when the first network equipment is the master network node, and after the fifth feedback information transmitted by the terminal is received, the processor is configured to perform at least one of following handling operations:

triggering a packet counting and checking procedure between the first network equipment and the terminal;

triggering an integrity protection procedure for a DRB between the first network equipment and the terminal;

releasing a wireless link connection or the DRB between the second network equipment and the terminal;

reconfiguring a wireless link connection between the second network equipment and the terminal; or triggering a handover procedure between the second network equipment and other secondary network node.

17. A method for handling data radio bearer (DRB) integrity check failure (ICF), applied to a terminal, comprising:

acquiring an ICF event of a DRB between the terminal and a second network equipment; and transmitting, according to the ICF event, feedback information to a first network equipment, wherein the first network equipment is one of a master network node and a secondary network node for the terminal, and the second network equipment is the other one of the master network node and the secondary network node for the terminal, wherein the acquiring the ICF event of the DRB between the terminal and the second network equipment comprises:

detecting the DRB between the terminal and the second network equipment and triggering a generation of the ICF event, in case that it is detected that an ICF occurs to the DRB between the terminal and the second network equipment, wherein the transmitting, according to the ICF event, the feedback information to the first network equipment comprises: stopping transmitting data over the DRB between the terminal and the second network equipment after the generation of the ICF event, and transmitting, to the first network equipment, information about the DRB corresponding to the ICF event, wherein the feedback information comprises information about the failure DRB between the second network equipment and the terminal, and the information about the failure DRB comprises at least one of:

first indication information for indicating whether the DRB is a split DRB;

identification information of the DRB; or identification information of a logical channel corresponding to the DRB.

18. A terminal, comprising a processor, a storage and a computer program stored in the storage, wherein when executing the computer program, the processor is configured to implement steps of the method for handling data radio bearer (DRB) integrity check failure (ICF) according to claim 17.

19. A non-transitory computer-readable storage medium, storing therein a computer program, wherein when executing the computer program, a processor is configured to implement steps of the method for handling the DRB ICF according to claim 17.

\* \* \* \* \*